United States Patent [19]
Dalton et al.

[11] 3,970,781
[45] July 20, 1976

[54] APPARATUS FOR MAINTAINING THE POSITION OF A WORKING HEAD IN RELATION TO A CYLINDRICAL WORKPIECE

[75] Inventors: Brian L. Dalton, London; Edward J. Judd, Hemel Hempstead, both of England

[73] Assignee: Crosfield Electronics Limited, London, England

[22] Filed: Aug. 21, 1975

[21] Appl. No.: 606,571

[30] Foreign Application Priority Data
Aug. 22, 1974 United Kingdom............... 36974/74

[52] U.S. Cl............................. 178/7.6; 178/6.6 B; 178/6.7 R; 346/76 L; 346/139 D
[51] Int. Cl.².......................................... H04N 1/24
[58] Field of Search............... 178/7.6, 6.6 B, 6.7 R; 346/76 L, 139 D

[56] References Cited
UNITED STATES PATENTS

| | | | |
|---|---|---|---|
| 3,657,707 | 4/1972 | McFarland | 346/76 L |
| 3,737,877 | 6/1973 | Feinleib | 346/76 L |

Primary Examiner—Howard W. Britton
Attorney, Agent, or Firm—Toren, McGeady and Stanger

[57] ABSTRACT

In a laser scanning apparatus, in which a laser and a focusing lens are moved in a direction parallel to the cylinder axis during rotation of the cylinder so that the focused laser beam traces out a helical path on the cylindrical surface, the laser and focusing lens are mounted to permit relative movement in the said direction parallel to the cylinder axis and are separately driven, the driving means for the focusing lens being such as to permit a rate of movement of the focusing lens in the said direction more uniform than can be achieved with the laser driving means, the size of the lens aperture and the extent of the said relative movement during operation of the driving means being such that the laser beam always passes through the lens aperture; the uniformity of the movement of the focused laser beam along the cylindrical surface is then governed by the uniformity of the movement of the focusing lens, the lens head being lighter in weight than the laser head.

10 Claims, 7 Drawing Figures

APPARATUS FOR MAINTAINING THE POSITION OF A WORKING HEAD IN RELATION TO A CYLINDRICAL WORKPIECE

This invention relates to apparatus in which the beam from a laser light source is required to sweep out a scanning raster on the surface of a cylinder or on a sheet placed around the cylinder and in which this raster scanning is brought about by rotation of the cylinder about its axis in combination with a slow movement of the laser in a direction parallel to the cylinder axis. In such apparatus, the beam sweeps out a helical path around the cylinder surface, the pitch of this helix being very fine. This helix pitch must be maintained uniform to within very close tolerances, especially when separate colour-component images are subsequently to be superimposed.

The invention is particularly concerned with the accuracy with which this uniformity of pitch is maintained.

In one form of apparatus which we have developed, the laser was stationary and an optical system including a reflector for turning the beam through 90° traversed a bed plate in a direction parallel to the cylinder axis. The laser beam left the laser parallel to the cylinder axis and after reflection met the cylinder perpendicularly to its surface. However, problems arise in such an arrangement due to beam divergence when the laser is of the high-power long-wavelength type, such as the $CO_2$ laser. Consequently in a preferred arrangement, the laser itself traverses the machine bed plate to produce the relative axial movement between the laser beam and the cylinder. Unfortunately, this creates a further problem because the weight of the laser carriage is considerably more than that of the traversing optical system of the stationary laser arrangement and consequently more robust guiding and driving means are required and it then becomes more difficult to obtain a speed of traversing movement sufficiently uniform to obtain the uniformity of pitch previously referred to.

Similar problems arise in large analysing scanners for image reproduction, where an analysing head including a laser light source moves parallel to the axis of a cylinder bearing an original to be reproduced.

According to the present invention, such apparatus comprises guiding means extending parallel to the axis of the cylinder, a scanning head including the laser, a focusing lens for focusing the beam of the said laser on to the surface of the cylinder or sheet wrapped around the cylinder a driving system for rotating the cylinder and including first and second driving means for moving the scanning head and lens, simultaneously with the cylinder rotation along first and second paths parallel to the cylinder axis so that the scanning head acts through the focusing lens to move the laser beam along the cylinder surface in a direction parallel to the cylinder axis and the beam traces out a helical path on the rotating cylinder, the first and second driving means being such that the rate of movement of the focusing lens along the said second path is more uniform than that of the scanning head along the said first path, the focusing lens and the scanning head being mounted to permit, during such movement parallel to the cylinder axis, relative movement between them in the direction parallel to the cylinder axis, the size of the lens aperture and the extent of permitted relative movement being such that the laser beam always passes through the lens aperture.

In the preferred form of apparatus embodying the invention, the laser moves along a "coarse" lead screw on a coarse bed and the lens assembly moves along a high quality lead screw on a precision bed. A precision optical grating is mounted alongside and parallel to the lens lead screw and the lens assembly carries a grating reading head. Pulses from the grating reading head as the lens assembly moves along its lead screw are applied to a closed-loop servo system to provide an error signal for controlling the servo motor which drives the lens assembly lead screw. The closed-loop servo system is of the phase-lock type and includes a comparator comparing the pulses from the grating reading head with clock pulses from a reference source. The reference source also serves, through a frequency divider unit, to control the main motor which drives the laser lead screw.

Although we prefer the use of a precision optical grating and a closed-loop servo system, it may in some cases be possible to dispense with the grating and closed loop system, particularly when the lead screws are short, and to rely upon the precision of the lens assembly lead screw and slideway to ensure the required uniformity of motion in the direction parallel to the cylinder axis.

Basically, the invention relies upon the fact that if the beam of light is parallel to the axis of the lens when it reaches the lens surface it will be focused on the same point of the cylindrical surface, no matter at which point the beam strikes the lens surface. In other words, as long as the laser does not tilt by a large amount with respect to the cylinder, it is unnecessary to position the whole laser carriage with the accuracy required for the scanning pitch uniformity at the cylinder surface; it is sufficient to achieve this accuracy only with the movement of the output lens. Consequently the laser system can be allowed to deviate from the required uniformity of movement within much larger tolerances and this facilitates and renders less expensive the construction of the drive and bed plate for the traversing laser system.

Apparatus embodying the above invention will also automatically correct for errors in the position of the laser in the vertical sense, assuming that the cylinder axis is horizontal; such errors might be caused, for example, by flexure of the laser supporting system due to the weight of the laser. Again, provided that the laser does not tilt and that the error in its vertical position is not such as to cause its beam to fall outside the lens aperture, the focused image of the beam will fall on the same area of the cylinder surface.

It is also desirable, of course, to maintain the distance between the focusing lens and the cylinder surface at a constant value. However, the tolerances in this direction and in the "vertical" direction mentioned above are much wider than in the direction of movement of the scanning beam parallel to the cylinder axis.

In order that the invention may be better understood, some forms of apparatus embodying the invention will now be described with reference to the accompanying drawings, in which.

Figure 1:
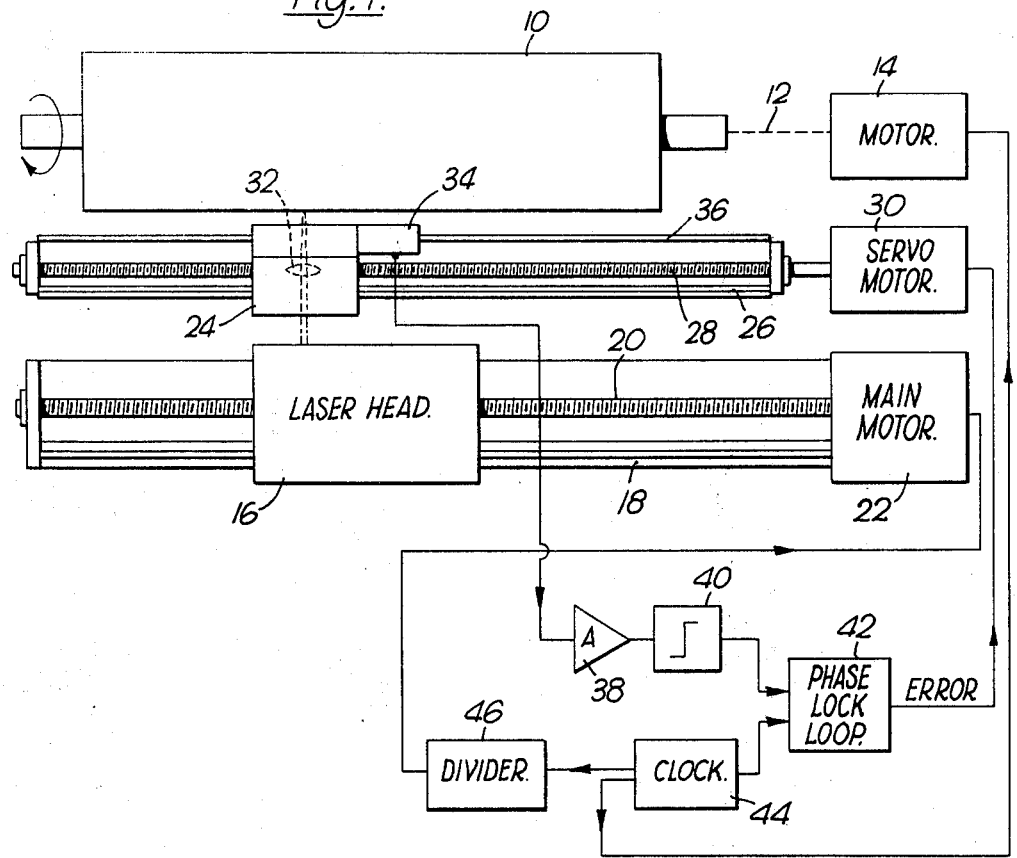
FIG. 1 illustrates apparatus embodying the invention employing a closed-loop positioning system for the lens assembly.

In FIG. 1 the surface of a cylinder 10, mounted for rotation about an axis 12 by a motor 14, is to be engraved by a beam from a laser in a laser head 16. The laser head 16 is mounted on a primary slideway 18 and is driven along a lead screw 20 by the rotation of a motor 22.

A lens assembly 24 is mounted for movement along a precision bed plate 26 and is driven along a lead screw 28 through the rotation of that lead screw by a servo motor 30. The lens assembly 24 is light in weight by comparison with the laser head 16 and the lead screw 28 is of much higher quality and precision than the lead screw 20.

Similarly, the bed plate 18 can be coarse by comparison with the bed plate 26.

In addition to a lens 32, the lens assembly 24 carries a grating reading head 34. This co-operates with a precision optical grating 36 extending parallel to the lead screw 28 and includes means for generating electrical signals corresponding to the grating rulings as the lens assembly moves past the grating. The resulting electrical pulse signals are applied through an amplifier 38 and a squaring circuit 40 to a phaselock comparator 42 which receives its second input signal from a reference source 44 of clock pulses. Any error in the phase of the received grating pulses results in the generation of an error signal in the circuit 42 and this error is reflected in the signal applied from the circuit 42 to the servo motor 30.

The reference clock pulse source 44 also acts through a divider circuit 46 to control the speed of rotation of the motor 22 which drives the laser lead screw 20. It also acts to control the speed of rotation of the motor 14 which rotates the cylinder 10.

From the above description, it will be seen that provided that the laser beam remains parallel to the lens axis and perpendicular to the cylinder axis, and provided that the beam remains within the lens aperture, relative movement between the lens and laser in the direction of their lead screws does not result in a positional error of the beam at the cylinder surface. The beam thus moves along the cylinder surface at the speed of the lens assembly and the uniformity of pitch of the scanning lines is thus equal to the uniformity in the speed of movement of the lens assembly along its lead screw.

Furthermore, it the laser head in FIG. 1 moves in a direction perpendicular to the plane of the paper, the accuracy of the beam positioning at the cylinder surface will still not be affected provided the above conditions are met, that is to say provided that the laser does not tilt and that the beam still falls within the lens aperture.

The servo motor of the apparatus described was also fitted with a tacho generator for additional velocity damping. This is a known arrangement and forms no part of the present invention and will not therefore be described in detail.

Figure 2:
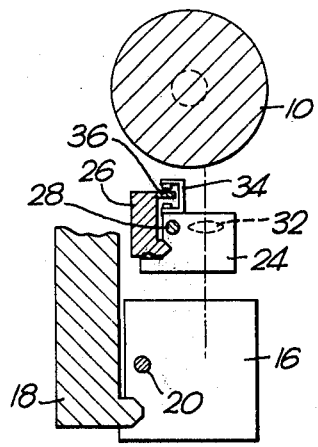
FIG. 2 is a diagrammatic sectional view of the cylinder and the laser and lens mounting assemblies of FIG. 1.
Figure 3:
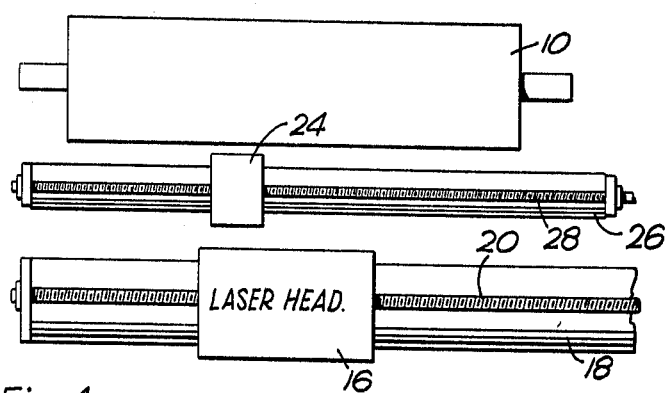
FIG. 3 illustrates an open-loop system.

Although we prefer the apparatus described in connection with FIGS. 1 and 2, where the lead screw is of short length, it may in some cases be possible to dispense with the closed-loop control system and simply to provide a high accuracy slideway and lead screw for the lens assembly. Thus, in the apparatus described with reference to FIG. 3, the grating, the grating reading head and the phase-lock loop compensating system are dispensed with.

Figure 4:
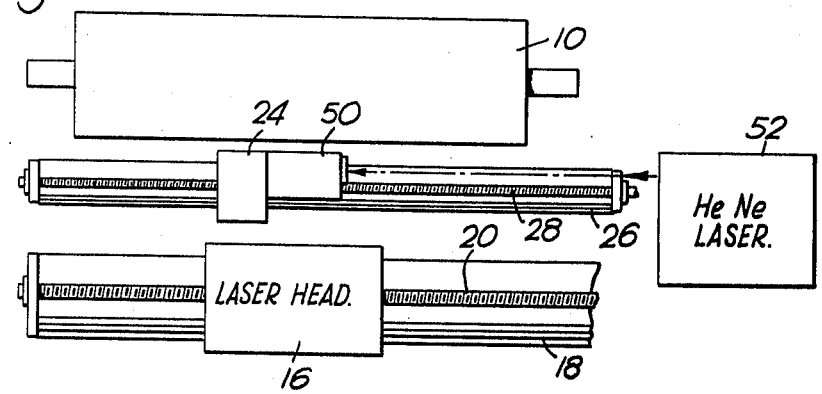
FIG. 4 illustrates the open-loop system, additionally comprising means for maintaining constant the distance between the lens assembly and the cylinder surface.

As we have stated above, the accuracy with which the distance between the lens assembly and the cylinder must be maintained is not as great as that required for movement of the beam in a direction parallel to the cylinder axis. Nevertheless, it may in some cases be necessary to provide an auxiliary control system to reduce variation in this distance. Such an arrangement is shown in FIG. 4, in which the focal distance control system is applied, for the sake of simplicity, to apparatus of the kind shown in FIG. 3. In FIG. 4, a photocell-controlled positioning servo 50 is mounted on the subsidiary slideway and controls the fine positioning of the focusing lens assembly 24. A helium-neon laser 52 directs an optical-wavelength beam on to a position-sensitive photocell in the servo system 50 to permit the movement of the lens towards and away from the cylinder.

Figure 5:
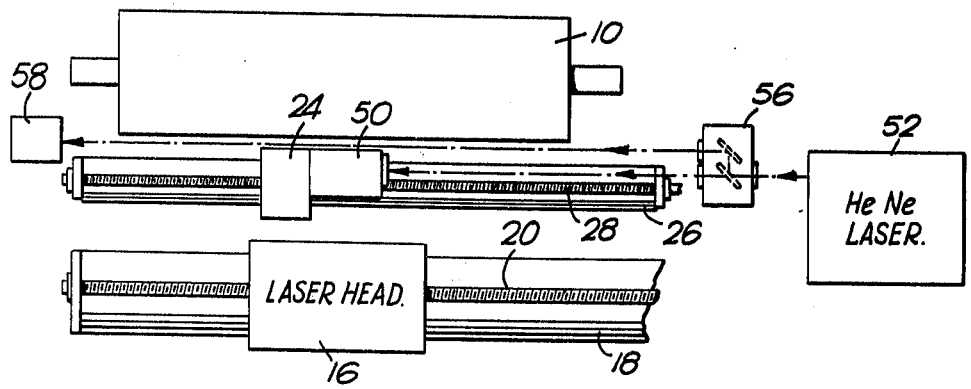
FIG. 5 illustrates an alternative form of apparatus for maintaining constant the distance between the lens assembly and the cylinder.

The arrangement shown in FIG. 5 is similar to that of FIG. 4, except that a beam splitter 56 is introduced in the path of the laser beam. The reflected part of the laser beam travels to a further position-sensitive photocell 58 and is used in the initial setting-up of the system, the axes of the parts of the system being adjusted to maximise transmission of the reference beam to the photocell 58.

Preferably, the beams derived from the helium-neon laser are enclosed to limit the effects of atmospheric refraction. Also, a bellows coupling may be provided between the laser head 16 and the lens assembly 24 in any of the drawings described.

Figure 6:
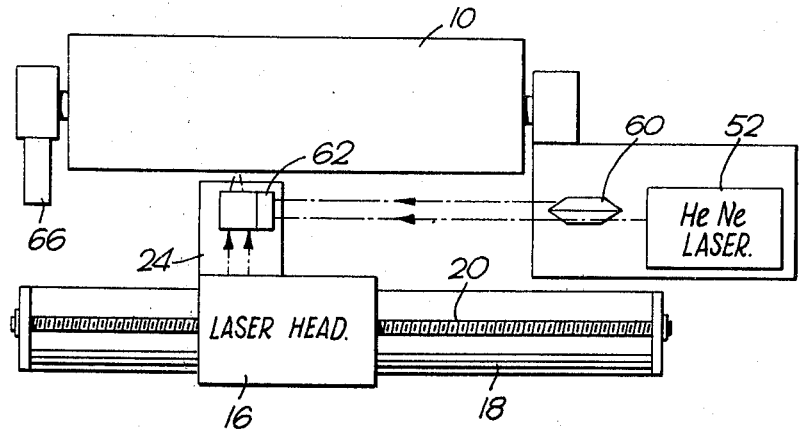
FIG. 6 illustrates yet a further form of apparatus embodying the invention.
Figure 7:
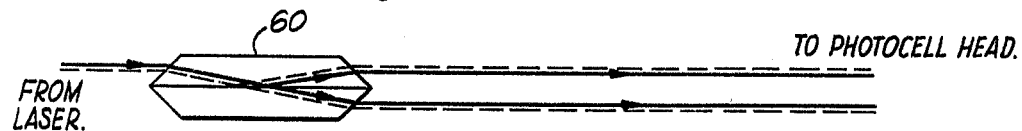
FIG. 7 illustrates a beam splitter used in the apparatus of FIG. 6.

In the arrangement shown in FIG. 6, a beam splitting prism 60 is arranged in front of the helium-neon laser, which is mounted on the cylinder bearing block. The two beams from the prism 60 are incident on a twin-photocell position-sensitive system 62 in a servo control unit. The system is such that the photocell unit gives a null output when the distance between the lens and the cylinder surface is correct. If however the lens should deviate from the straight line defined by the laser beam the photocell will give a non-zero output which is used to reposition the lens and photocell unit until the null reading is regained. A system utilising a single beam from the secondary laser would rely on the secondary laser beam remaining stable in position and direction and on the distribution of intensity in the secondary laser beam remaining constant. In the apparatus shown in FIGS. 6 and 7 the dual-beam system is independent of these properties. The beam splitter which is responsible for this independence is shown in enlarged form in FIG. 7, from which it will be seen that it consists of two prismatic portions, the contact surface between the two portions being suitably coated to cause the beam shown in full lines to be partially reflected at this surface and partially transmitted through the surface, the resulting beams being parallel on emerging from the beam splitter.

The beam that undergoes a single reflection will be reversed relative to the input beam and to the other beam, and consequently the beam-intensity profile in one beam is mirror-imaged in the other. Furthermore, if the input beam is displaced laterally (as shown in dotted lines) the output beams will be displaced in opposite directions, the mid point between the two beams remaining stationary. Similarly, if the direction of the input beam is changed, the direction of the two output beams will change in opposite directions, the mid point between the two beams again being stationary. Hence, the reference direction is defined not by the laser but by the contact line between the two prisms. It is therefore only necessary that this plane be located accurately and stably relative to the cylinder.

The photocell system employs two position-sensitive photocells, one to intercept each beam. By suitable connection of these photocells (that is to say by adding together the outputs from each cell), a null signal is achieved, independent of small changes in the separation of the two beams. Also, if the beam intensity profile changes with distance along the beam, the mirror-imaging by the prism causes the photocells to see an apparent equal and opposite shift of the beams which will not affect a null reading. However, when a relative shift between one position-sensitive photocell and its incident beam is in the same direction as a relative shift between the other position-sensitive photocell and its incident beam, an error signal will be produced and this operates the servo system to produce a focusing shift of the lens. Preferably, an amplifier giving a constant sensitivity to shift, independent of beam intensity, is used in the control circuit.

In FIG. 6, an additional photocell unit 66 is mounted on the cylinder bearing block at the end opposite to the secondary laser head. This photocell unit 66 is used for the initial setting-up and for checking the alignment of the prism unit.

In general the prism shown could be replaced by any beam splitting or mirror arrangement that causes one beam to undergo an even number of reflections and the other to undergo an odd number of reflections before emerging parallel to each other.

Although the invention has been described in connection with a gravure apparatus for engraving a cylinder, it is also applicable to the exposing, by means of the laser beam, of a lithographic or other sheet sensitive to the laser wavelength, wrapped around the cylinder surface.

We claim:

1. Apparatus for scanning the cylindrical surface of a cylinder or of a sheet wrapped around the cylinder with a laser beam, the cylinder being mounted for rotation about its axis, comprising:
   a scanning head including a laser;
   a lens head comprising an aperture and a focusing lens positioned for focusing the beam of the said laser on to the said cylindrical surface;
   a driving system for rotating the cylinder and including first and second driving means for moving the scanning head and lens head, simultaneously with the cylinder rotation, along first and second paths, respectively, each path being parallel to the axis of the cylinder so that the scanning head acts through the focusing lens to move the laser beam along the said cylindrical surface in a direction parallel to the cylinder axis and the beam traces a helical path on the rotating cylinder, the first and second driving means being constructed so that the rate of movement of the lens head by the second driving means is more uniform than that of the scanning head by the first driving means;
   the lens head and the scanning head being mounted to permit, during such movement in a direction parallel to the cylinder axis, relative movement between them in the said direction to accommodate differences in their rates of movement, the size of the said lens head aperture and the extent of the said permitted relative movement being such that the laser beam always passes through the lens aperture during operation of the driving system.

2. Apparatus in accordance with claim 1, in which the lens head is lighter in weight than the scanning head, and in which the said first driving means comprises a first lead screw and first slideway for the scanning head and the second driving means comprises a second lead screw and second slideway for the lens head, and in which the second lead screw and second slideway are constructed to permit movement of the lens head at a more uniform speed than is permitted by the first lead screw and first slideway.

3. Apparatus in accordance with claim 1, further comprising means maintaining the focusing lens, during its movement along the guiding means, at a constant distance from the cylinder axis.

4. Apparatus according to claim 3, in which the means for maintaining the focusing lens at a constant distance from the cylinder axis comprises sensing means for detecting deviation of the focusing lens from a line parallel to the cylinder axis and positioning means for moving the focusing lens back towards the said line in response to error signals from the sensing means.

5. Apparatus in accordance with claim 4, in which the sensing means includes a further laser arranged to direct a beam of light along a path parallel to the axis of the cylinder, and the sensing means comprises light-responsive means mounted for movement with the focusing lens and positioned to receive light from the said further laser, the light responsive means being adapted to generate an error signal when the focusing lens deviates from the said line parallel to the cylinder axis.

6. Apparatus in accordance with claim 5, further comprising a servo system connected to receive the said focusing error signal and adapted to move the focusing lens in a direction towards or away from the cylinder axis such as to reduce the size of the error signal.

7. Apparatus in accordance with claim 6, including a beam splitter for splitting the beam from the said further laser into two beams, the light responsive means being so positioned with respect to the said two beams that movement of the focusing lens away from the line parallel to the cylinder axis results in unequal intensities of the light from the split beams falling on the light responsive device, whereby the light responsive device generates unequal signals, the difference between the said unequal signals being applied to the servo system for repositioning the focusing lens.

8. Apparatus in accordance with claim 7 in which the beam splitter is such that one beam undergoes an even number of reflections and the other undergoes an odd number of reflections, the beams emerging from the beam splitter parallel to one another.

9. Apparatus for scanning the cylindrical surface of a cylinder, or of a sheet wrapped around the cylinder, with a laser beam, the cylinder being mounted for rotation about its axis, comprising:

a scanning head including a laser;

a lens head comprising an aperture and a focusing lens for focusing the beam of the said laser on to the said cylindrical surface;

a driving system for rotating the cylinder and including first and second driving means for moving the scanning head and lens head, simultaneously with the cylinder rotation, along first and second paths, respectively, each path being parallel to the axis of the cylinder, so that the scanning head acts through the focusing lens to move the laser beam along the cylindrical surface in a direction parallel to the cylinder axis and the beam traces a helical path on the rotating cylinder;

the second driving means comprising an optical grating extending parallel to the cylinder axis, a grating reading head fixed to the lens head, and a closed-loop servo system for controlling the speed of movement of the lens head and grating head parallel to the grating as a function of the output of the grating reading head;

the lens head and the scanning head being mounted to permit, during their movement in a direction parallel to the cylinder axis, relative movement between them in the said direction to accommodate differences in their rates of movement;

the size of the lens head aperture and the extent of said permitted relative movement being such that the laser beam always passes through the lens aperture during operation of the said driving system.

10. Apparatus in accordance with claim 9, in which the closed loop servo system is a phase-lock loop including a comparator comparing pulses derived from the grating reading head with reference clock pulses and applying correcting signals to the said second driving means.

* * * * *